United States Patent
Graf, Jr.

[11] Patent Number: 5,283,974
[45] Date of Patent: Feb. 8, 1994

[54] ENVIRONMENTALLY CONTROLLED DISPLAY CABINET

[76] Inventor: David B. Graf, Jr., 517 Indian Creek Dr., Trophy Club, Tex. 76262

[21] Appl. No.: 697,888

[22] Filed: May 9, 1991

[51] Int. Cl.$^5$ .................................... A01G 31/00
[52] U.S. Cl. .................................... 47/60
[58] Field of Search .................... 47/60 E C, 17 E C

[56] References Cited

U.S. PATENT DOCUMENTS

| | | | |
|---|---|---|---|
| 3,381,409 | 5/1968 | Lamont | 47/60 E C |
| 3,424,231 | 1/1969 | Truhan | 47/60 E C |
| 3,458,951 | 8/1969 | Martin | 47/60 E C |
| 3,536,370 | 10/1970 | Evans et al. | 47/60 E C |
| 3,673,733 | 7/1972 | Allen | 47/60 E C |
| 3,746,080 | 7/1973 | Mallory | 47/60 E C |
| 3,905,153 | 9/1975 | Enter | 47/60 E C |
| 3,921,899 | 11/1975 | Hamilton | 236/9 S |
| 4,216,741 | 8/1980 | Moss | 47/60 E C |
| 4,276,925 | 7/1981 | Palmieri | 236/46 R |
| 4,543,744 | 10/1985 | Royster | 47/60 E C |
| 4,567,732 | 2/1986 | Landstrom et al. | 47/17 E C |
| 5,115,968 | 5/1992 | Grald | 236/78 D |

Primary Examiner—Ramon S. Britts
Assistant Examiner—Joanne C. Downs
Attorney, Agent, or Firm—W. Kirk McCord

[57] ABSTRACT

An environmentally controlled cabinet is provided for maintaining and displaying plants of various types indoors. A fresh water supply, cooling system and exhaust and ventilation fans are contained in the cabinet, so that the entire system is portable. The cabinet further includes a computerized control system, which is responsive to user input commands for controlling various environmental functions, such as plant watering, temperature, humidity, air circulation and lighting. The ambient conditions within the cabinet are programmable for daytime, nighttime and seasonal cycles. The ambient temperature within the growing chamber can be maintained at a relatively constant level, or alternatively, a temperature differential can be maintained within the growing chamber to accommodate various types of plants which thrive under different temperature conditions.

7 Claims, 9 Drawing Sheets

ENVIRONMENTALLY CONTROLLED DISPLAY CABINET

FIELD OF INVENTION

This invention relates generally to cabinets for displaying items, such as indoor plants, and in particular to an environmentally controlled cabinet for displaying plants.

BACKGROUND OF THE INVENTION

Certain kinds of plants thrive indoors where the ambient conditions are controlled. Indoor plants enhance the beauty and aesthetic appeal of a room in which the plants are displayed. Other kinds of plants thrive in conditions which are substantially different from normal ambient conditions indoors. For example, some plants, such as tropical flowers and the like, may require temperature and humidity conditions which are higher than normal in an indoor environment. Consequently, a greenhouse or other controlled environment is normally required for these types of plants to thrive, which prevents them f rom being displayed and enjoyed in a home or office.

The need therefore exists in the art for an environmentally controlled enclosure for plants, which is adapted for being located indoors, so that the plants can be maintained and displayed indoors.

SUMMARY OF THE INVENTION

These and other objects are accomplished in accordance with the present invention wherein a portable cabinet is provided for storing plants in a controlled environment. The cabinet has an enclosed chamber for storing the plants and means responsive to input commands for automatically controlling selected environmental conditions in the chamber according to a predetermined set of program instructions. The controlled conditions include cabinet lighting, temperature and humidity. Input means is provided for entering input commands indicative of the desired environmental conditions to be maintained in the chamber.

In accordance with one aspect of the invention, the cabinet further includes means for illuminating the chamber, means for cooling the chamber, means for humidifying the chamber, means for watering the plants stored in the chamber, means for circulating air in the chamber and means communicating between the chamber and an indoor environment outside the cabinet for ventilating the chamber. The control means is programmable for controlling the illuminating means, cooling means, humidifying means, watering means, air circulating means and ventilating means to maintain the desired environmental conditions in the chamber in accordance with the input commands. In one embodiment, the control means includes a programmable computer and sensing means for monitoring temperature and humidity conditions in the chamber. The computer is responsive to the temperature and humidity conditions in the chamber for controlling the operation of the illuminating means, cooling means, humidifying means, air circulating means and ventilating means to maintain the desired temperature and humidity conditions in the chamber according to the input commands.

In accordance with another aspect of the invention, the cabinet includes air moving means adjacent one side of the chamber for directing a substantially lateral flow of air toward an opposite side of the chamber and air cooling means located external to the chamber. A first air duct communicates between the opposite side of the chamber and an intake side of the air cooling means for conducting at least a portion of the air directed toward the opposite side of the chamber by the air moving means to the air cooling means. A second air duct communicates between the opposite side of the chamber and a discharge side of the air cooling means for directing cooled air from the air cooling means into the chamber adjacent the opposite side of the chamber. The cooled air has a lower temperature than the temperature of the air directed toward the opposite side of the chamber by the air moving means, such that a temperature differential exists between the opposed sides of the chamber.

In accordance with yet another aspect of the invention, the control means is responsive to user input commands for selectively enabling and disabling the illuminating means at predetermined times and is further responsive to the temperature of the chamber for automatically disabling the illuminating means when the chamber temperature exceeds a first predetermined temperature for a first predetermined time interval and for automatically enabling the illuminating means when the chamber temperature is less than or equal to a second predetermined temperature, which is less than the first predetermined temperature, for a second predetermined time interval.

In accordance with still another aspect of the invention, the cabinet includes means for watering the plants in the chamber and means located below the chamber for collecting material flowing downwardly therefrom. The watering means includes a water storage tank and means for supplying water from the storage tank to the chamber. The collection means includes a collection tank and means for evacuating the contents thereof. The control means monitors the volume of water in the storage tank and the volume of material in the collection tank and is responsive to a low water condition in the storage tank or a high water condition in the collection tank for automatically disabling the water supply means.

In accordance with yet another aspect of the invention, the control means selectively enables and disables the cooling means to maintain the temperature of the chamber within a predetermined range according to user input commands. The control means selectively activates and deactivates the cooling means so that when the temperature is below a predetermined minimum limit, the temperature of the chamber is increased at a predetermined rate until the temperature is within the predetermined range and when the temperature of the chamber is above a predetermined maximum limit, the temperature is decreased at a predetermined rate until the temperature is within the predetermined range.

In accordance with still another aspect of the invention, the control means selectively activates and deactivates the humidifying means to maintain the humidity of the chamber within a predetermined range. The control means operates the air circulating means and selectively activates the humidifying means for a first predetermined time interval if the humidity remains below a predetermined minimum limit after the air circulating means has been operated for a period of time at least equal to a second predetermined time interval. The humidifying means is selectively activated and deactivated according to a predetermined iterative cycle until either the humidity is within the predetermined range or the number of iterative cycles equals a prescribed maximum number. The control means operates the air circulating means when the humidity is equal to or greater than a predetermined maximum limit and selectively activates the ventilating means for a third predetermined time interval, if the humidity remains at or above the predetermined maximum limit after the air circulating means has been operated for a period of time at least equal to a fourth predetermined time interval. The ventilating means is selectively activated and deactivated according to a predetermined iterative cycle until either the humidity is within the predetermined range or the number of iterative cycles equals a prescribed maximum number.

DETAILED DESCRIPTION OF THE PREFERRED EMBODIMENT

In the description which follows, like parts are marked throughout the specification and the drawings with the same respective reference numerals. The drawings are not necessarily to scale and in some instances proportions have been exaggerated to more clearly depict certain features of the invention.

Figure 1:
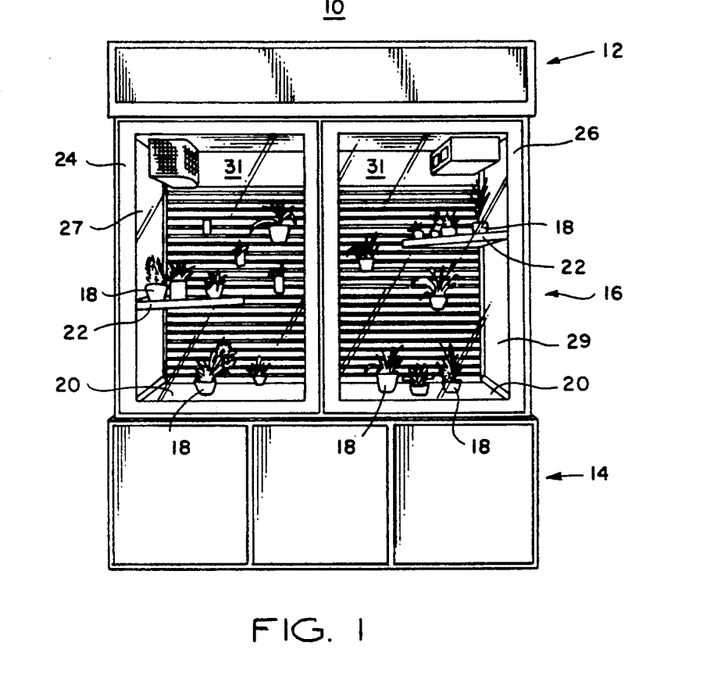
FIG. 1 is a front elevation view of an environmentally controlled cabinet for growing and displaying plants, according to the present invention.

Referring to FIG. 1, a cabinet 10 according to the present invention is comprised of a hood portion 12, a base portion 14 and a central housing 16, which encloses a growing chamber in which a plurality of plants 18 are stored. As depicted, some of the plants 18 are located on a floor 20 of central housing 16, while other ones of the plants 18 are supported on shelves 22 at various positions within central housing 16, which enhances the aesthetic appeal of the plant display.

The front part of central housing 16 is defined by two door panels 24 and 26, which swing outwardly to permit access to the plants 18. Door panels 24 and 26 are substantially transparent, such that the plants 18 can be viewed from the front of cabinet 10. Side panels 27 and 29 of central housing 16 are also preferably transparent, to permit viewing from the sides of cabinet 10. Door panels 24 and 26 and side panels 27 and 29 are preferably comprised of respective glass panels.

Figure 2:
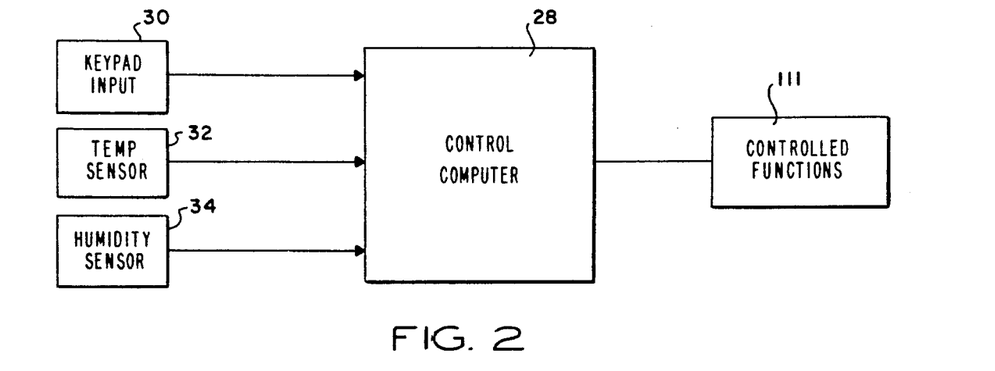
FIG. 2 is a schematic diagram of a computer-implemented apparatus for controlling the ambient conditions within the cabinet of FIG. 1.

Referring to FIGS. 1 and 2, a control computer 28 is preferably housed within base portion 14, for controlling the environmental conditions within central housing 16. Control computer 28 is responsive to user commands entered via a keypad 30 and to temperature and humidity sensors 32 and 34, respectively, for controlling the environmental conditions within central housing 16, as will be described in greater detail hereinafter. Keypad 30 is also preferably housed within base portion 14. Temperature and humidity sensors 32 and 34 are located in the growing chamber within central housing 16.

Figure 3:
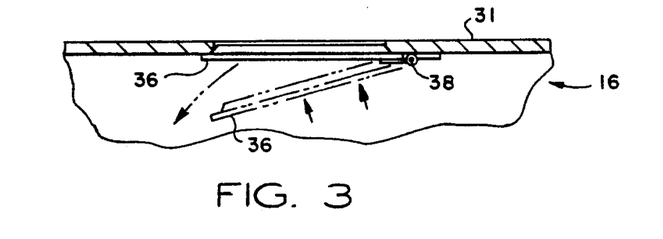
FIG. 3 is a partial top plan view of a back wall of the cabinet of FIG. 1, illustrating the operation of a pressure equalizing damper.

Referring now to FIGS. 1 and 3, a back wall 31 of central housing 16 includes a pivotally mounted damper 36, which opens into the chamber when the barometric pressure within the chamber is substantially less than the barometric pressure outside, to equalize the pressure inside and outside the chamber. A torsion spring 38 biases damper 36 toward the closed position, so that when the barometric pressure inside and outside the chamber are equalized, spring 38 will return damper 36 to the closed position.

Figure 4:
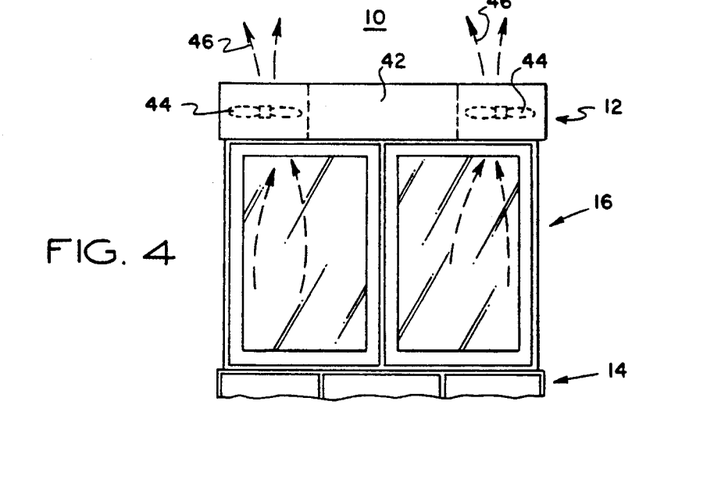
FIG. 4 is a partial front elevation view of the cabinet of FIG. 1, depicting ventilation within the cabinet.

Referring to FIG. 4, hood portion 12 includes a central section 42 in which a plurality of lights (not shown) are mounted for illuminating central housing 16. The lights preferably include both halide and sodium lamps to enhance plant growth. A pair of exhaust fans 44 are located on respective opposed sides of center section 42, to ventilate cabinet 10 by exhausting air upwardly and out of central housing 16, as indicated by arrows 46. Exhaust fans 44 are programmable for operating on a predetermined cycle or as needed to decrease temperature and/or humidity within the growing chamber.

Figure 5A:
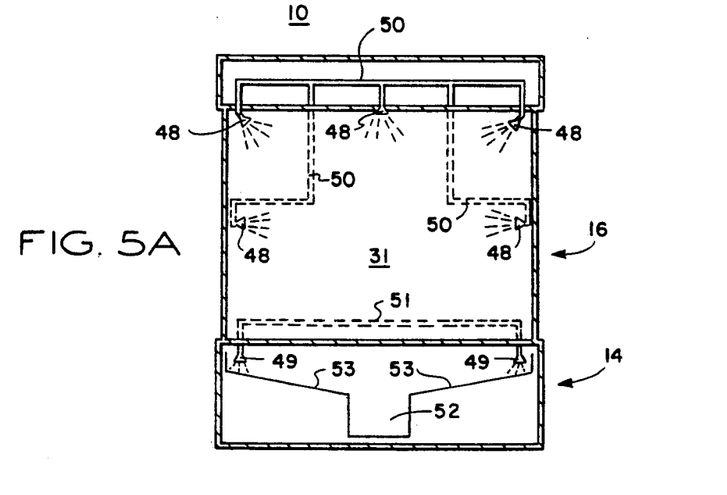
FIG. 5A is a front elevation, cutaway view of the cabinet of FIG. 1, depicting the operation of a misting system within the cabinet.
Figure 5B:
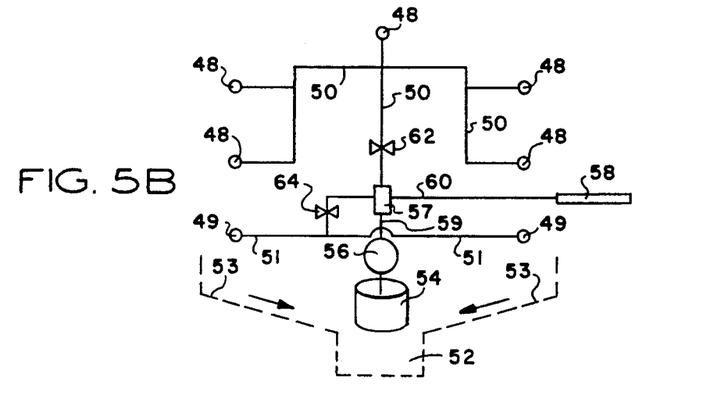
FIG. 5B is a schematic diagram of the misting system of FIG. 5A.

Referring to FIGS. 5A and 5B, cabinet 10 is equipped with a misting system and a humidifying system, which includes a plurality of misting heads 48 and a plurality of humidifying heads 49. Misting heads 48 are spread throughout the growing chamber and are located adjacent to back panel 31 of central housing 16. Heads 48 are configured to spray a relatively fine mist of water on the plants in the growing chamber. Humidifying heads 49 are located in base portion 14, to increase the humidity in the growing chamber. Heads 49 are also configured to emit a relatively fine mist when water pressure is supplied thereto. Misting heads 48 are supplied by a water line 50 and humidifying heads 49 are supplied by a water line 51. A waste water tank 52 is located at the bottom of base portion 14 for collecting drippings from the plants after the plants have been watered. A drain pan 53 funnels the drippings down to waste water tank 52. Drain pan 53 has a specially textured surface, which accumulates moisture when humidifying heads 49 are activated to enhance the humidification of the chamber. The surface of the drain pan 53 is preferably textured with a special paint, which provides a "crinkly" surface. A pump (not shown) is provided for removing the contents of waste water tank 52.

As best seen in FIG. 5B, fresh water is supplied from a fresh water tank 54, also located in base portion 14. A fresh water pump 56 is provided for suctioning fresh water from tank 54 and discharging the fresh water to a flow divider 57, which divides the water flow into three branches for supplying misting heads 48 via water supply line 50 humidifying heads 49 via water supply line 51 and a water wand 58, connected to flow divider 57 by means of a flexible hose 60. Wand 58 is used to manually water the plants in addition to or in lieu of the automatic misting system using misting heads 48. A pressure sensor is provided for sensing the pressure in a water supply line 59 between pump 56 and flow divider 57. When the water pressure drops below 40 psi, the pressure sensor will activate pump 56 until the pressure in water supply line 59 reaches approximately 60 psi, at which time pump 56 is shut off.

A solenoid-operated valve 62 is located in water supply line 50 for controlling the flow of water to misting heads 48 in accordance with a predetermined misting cycle, as will be discussed in greater detail hereinbelow. Another solenoid-operated valve 64 is located in water supply line 51 for controlling the flow of water to humidifiers 49 in accordance with a predetermined humidity control program, as will be described in greater detail below. When valve 62 or 64 is opened, pump 56 will be activated in response to the drop in pressure in water supply line 59, to maintain the desired water pressure. When both valves 62 and 64 are closed, the pressure will build up in water supply line 59 and when the pressure has increased to approximately 60 psi, pump 56 is deactivated.

Referring to FIGS. 1 and 6A-6C, a system for circulating air within central housing 16 includes two fans 66 located in the upper right-hand portion of the growing chamber (as viewed from the front of cabinet 10) and an air manifold 68 located in the upper left-hand portion of the growing chamber (as viewed from the front of cabinet 10). Air manifold 68 communicates with an air conditioning system 70 for directing relatively warm air entering a central portion 68A of air manifold 68 downwardly through air duct 72 to air conditioning system 70 and for directing conditioned air (which is approximately 20° F. cooler than the warm air entering central portion 68A of air manifold 68) flowing upwardly through air duct 74 and end portions 68B and 68C of air manifold 68 into the growing chamber. A blower 76 is located in air duct 74 for maintaining an air flow across the evaporation section of air conditioning system 70 and for urging conditioned air through end portions 68A and 68B of manifold 68.

Figures 6A, 6B, 6C, 7:
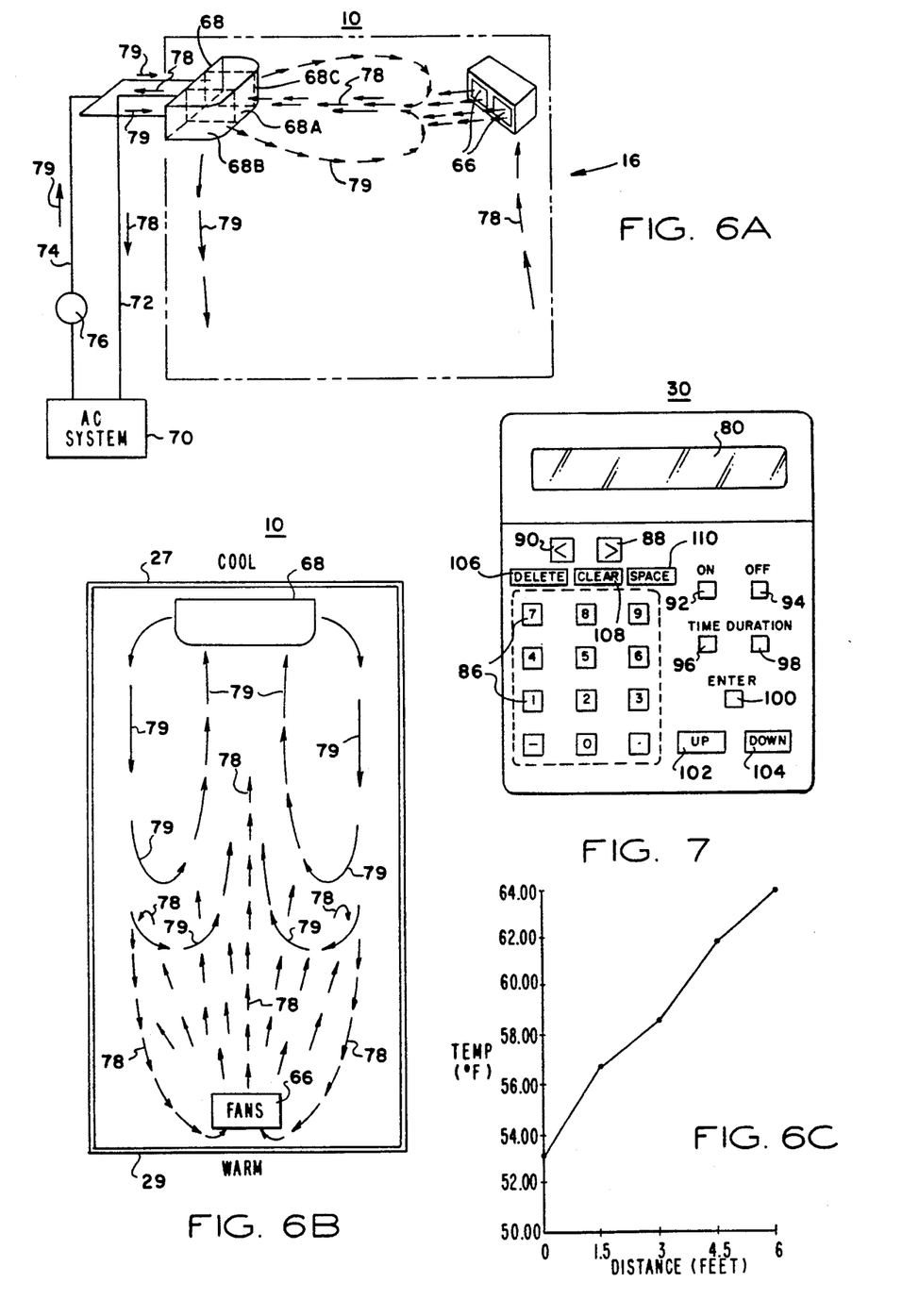
FIG. 6A is a partial perspective, partial schematic diagram, depicting air circulation within the cabinet.
FIG. 6B is a top plan view of the cabinet, depicting air circulation within the cabinet.
FIG. 6C is a graph, illustrating a typical horizontal temperature gradient within the cabinet.
FIG. 7 is a front elevation view of a control panel housed in the cabinet.

The air circulation pattern within the growing chamber is indicated by arrows 78 and 79. In FIG. 6B, the warm air is indicated by the shorter arrows 78, while the cool air is indicated by the longer arrows 79. Warm air 78 tends to rise along the right-hand side of the growing chamber and is blown substantially horizontally toward manifold 68 by fans 66. At least some of the horizontally blown warm air 78 mixes with the cooler conditioned air 79 emitted from end portions 68B and 68C of manifold 68. The horizontally blown warm air 78 also functions as a barrier against the horizontally blown conditioned air 79, to maintain the conditioned air 79 in a dual elliptical circulation pattern in the upper portion of the growing chamber, as can be best seen in FIG. 6A. As can be best seen in FIG. 6B, the warm air and the cool air are mixed at an intermediate location between left side 27 and right side 29 of the chamber. Furthermore, some of the conditioned air 79, being heavier than the warm air 78, will tend to sink along the left-hand side of the growing chamber, as indicated by the downwardly directed arrows 79.

The circulation pattern described above creates a horizontal temperature differential across the growing chamber, as depicted in FIG. 6C. FIG. 6C shows a typical temperature gradient, beginning at the left side 27 of cabinet 10 ("0" feet) and ending at the right side 29 of cabinet 10 ("6" feet). In FIG. 6C, the temperature at the right side 29 of cabinet 10 is approximately 11° F. higher than the temperature at the left side 27 of cabinet 10. The cooler temperatures are in the left portion of the chamber and the warmer temperatures are in the right portion thereof. Therefore, different ambient conditions can be maintained in selected portions of the growing chamber, to accommodate plants of various types. Plants which thrive in cooler temperatures are placed in the left portion of the chamber, while plants which thrive in warmer temperatures are located in the right portion of the chamber. When fans 66, blower 76 and air conditioning 70 are operating, a horizontal temperature gradient of approximately 10° F. is maintained across the growing chamber.

To maintain a temperature differential within the growing chamber, fans 66 and blower 76 are operated continuously and the compressor of the air conditioning system 70 is operated intermittently as needed to maintain the programmed temperature. If a temperature differential is not desired, fans 66 can be operated as desired to circulate air in the growing chamber.

Referring to FIGS. 2 and 7, control computer 28 is user-programmable by means of a digital keypad 30, which is located inside base portion 14 of cabinet 10. A liquid crystal display 80 is located adjacent keypad 30 for displaying selected information, including time of day, temperature and humidity. Display 80 has the capacity for displaying four lines of characters, with up to 16 characters per line.

Keypad 30 includes twelve number keys 86 (including a minus sign key and a decimal point key) for entering numerical data into control computer 28 and "forward" and "reverse" keys 88 and 90, respectively, for selecting a particular controlled function (e.g., temperature, humidity, watering, etc.) for which the numerical data is being entered. Keypad 30 further includes "on" and "off" keys 92 and 94 for manually controlling selected functions, "time" and "duration" keys 96 and 98, respectively, for entering start and stop times for various functions and the duration of each function, an "enter" key 100 for entering data and "up" and "down" keys 102 and 104, respectively, for allowing a user to review the data already entered into computer 28. A "delete" key 106, a "clear" key 108 and a "space" key 110 are also included. Delete key 106 is used to delete data previously entered into the computer 28. Clear key 108 is used to clear the immediately preceding entry from display 80 and space key 110 is used to interject spacing between numerical entries.

Figure 8:
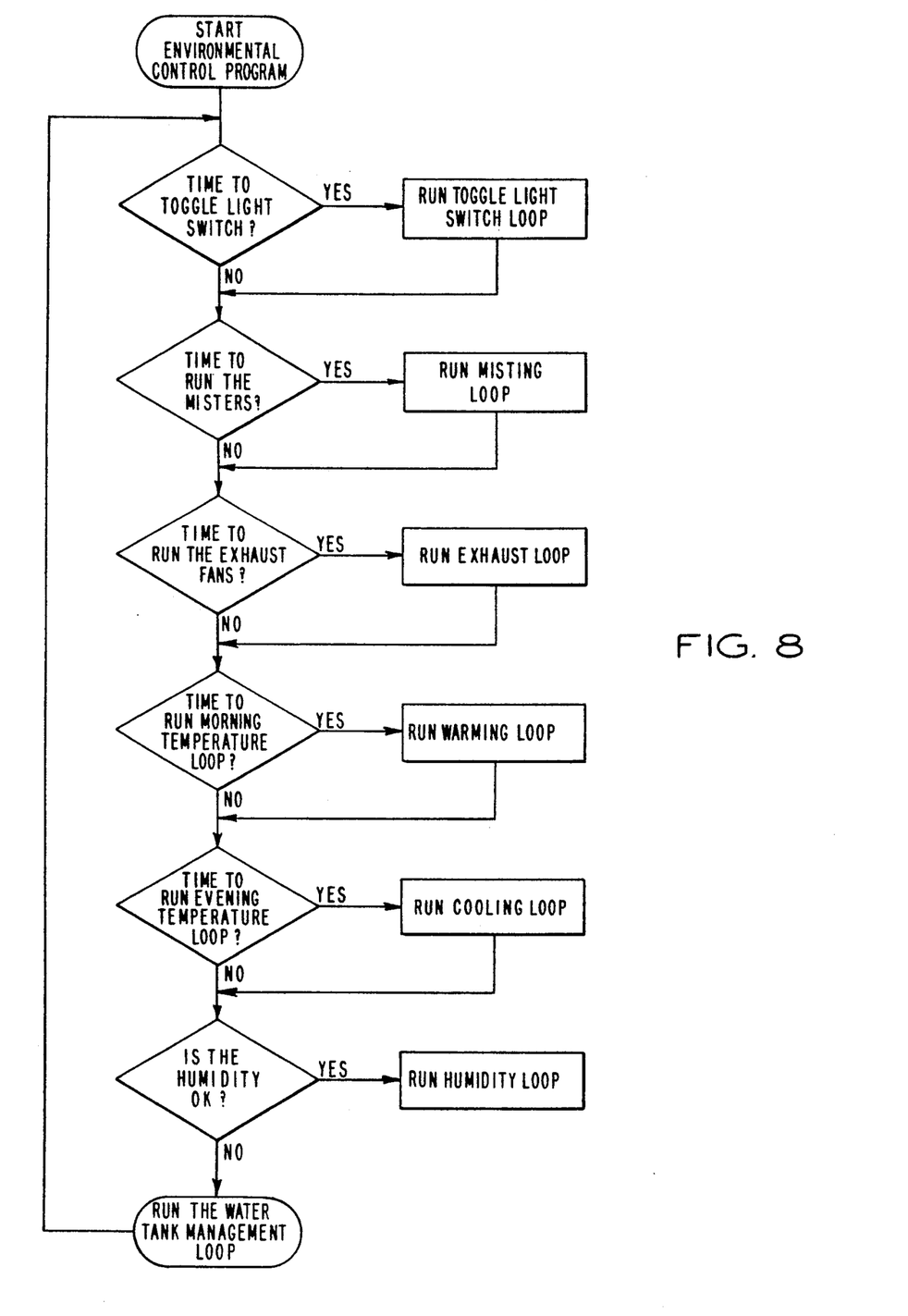
FIGS. 8–15 are respective flow diagrams, depicting the operation of the computer-implemented apparatus for controlling environmental conditions within the cabinet.

Referring to FIGS. 2 and 8, computer 28 is used to automatically control the various controlled functions 111, which include lighting, misting, ventilation, temperature, humidity, air circulation and water supply management, in accordance with a set of instructions programmed into computer 28. Computer 28 continually monitors temperature and humidity conditions within the growing chamber and time of day and selectively activates and deactivates the various equipment, such as the lights, cooling system, exhaust fans, circulation fans, watering system and humidifiers to maintain the environmental conditions in the growing chamber according to the desired conditions programmed by the user. The control program is depicted in general in FIG. 8. The control loops associated with the various controlled functions are depicted in greater detail in FIGS. 9-15.

Figure 9:
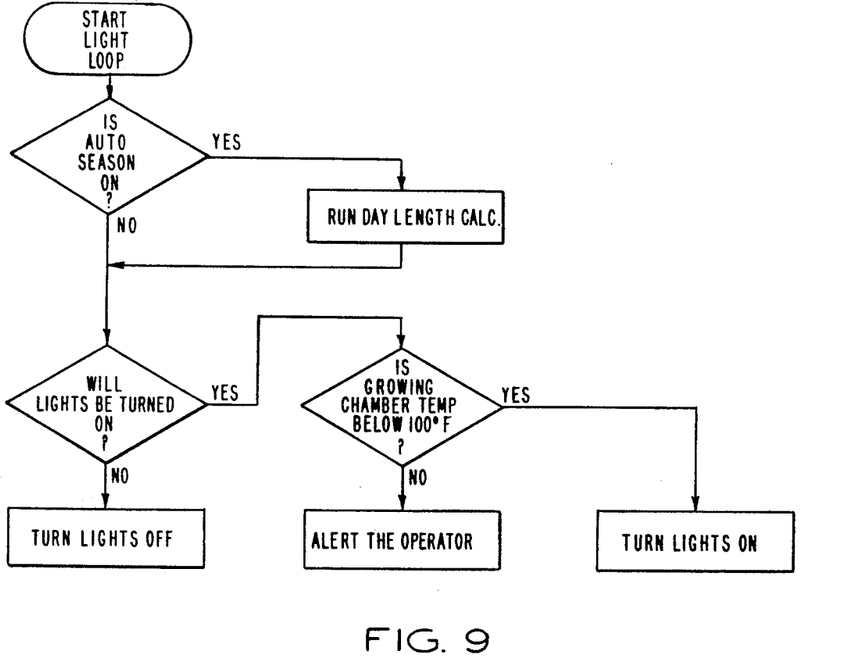

Referring to FIGS. 7 and 9, the time of day at which the cabinet lights are to be turned on and the time duration during which the lights will remain on are entered by the user via keypad 30. The user pushes forward key 88 or reverse key 90 to select the lighting function. A prompting message will appear on display 80, reminding the user to set in the time of day at which the lights are to be turned on and the duration during which the lights are to remain on. The user pushes time button 96 and enters the start time via number keys 86. The user then pushes duration key 98 and enters the time duration of the lights, also using number keys 86. The data is stored in the control computer by pushing enter key 100. The computer will determine the time of day at which the lights are to be turned off in response to the user-selected start time and duration. If the user does not enter a start time and/or duration for the lights, the default start time is set at 6:00 a.m. and the default duration is set at 12 hours.

The user can select an alternate mode of the lighting function by pushing forward key 88. In response to prompting messages on display 80, the user can program a variable duration for the lights to remain on, to simulate the changing length of the daylight hours as the seasons progress. The user first enters the number of days of the selected cycle (e.g., 180 days) and then enters the minimum day length (e.g., 10 hours) and the maximum day length (e.g., 15 hours) during the selected cycle. The user then enters the particular season (winter, spring, summer or fall) in which the cycle begins. The user also has the option to stop and hold the length of the day at the mid-cycle length for a selected number of days.

For example, assume that the user selects a cycle of 180 days, a minimum day length of 10 hours, a maximum day length of 15 hours, and the starting season as winter. Since winter is selected as the starting season, the initial day length will be the minimum day length (i.e., 10 hours). If the user has previously entered the time duration for the lights to remain on, the previously entered time duration data will be superseded by the newly entered day length information. The control computer will turn on the lights at the programmed time and the lights will remain on for 10 hours.

To account for the increasing length of the daylight hours as the season progresses from winter to summer, the control computer will increase the day length linearly from the minimum day length (i.e., 10 hours) to the maximum day length (i.e., 15 hours) at the mid-point of the cycle (i.e., the 90th day). The control computer will then decrease the day length linearly from the mid-point of the cycle (i.e., the 90th day) back to the minimum day length (i.e., 10 hours) at the end of the cycle (i.e., the 180th day).

If, however, the user desires to stop and hold the day length at the mid-cycle day length for a particular period of time, he will enter the number of days he desires the day length to be maintained at its mid-cycle length. For example, if the user desires the mid-cycle day length to be maintained for 90 days, the control computer will adjust the rate of increase of the day length so that the day length increases linearly from the 10 hour minimum to the 15 hour maximum in 45 days from the beginning of the cycle. The day length will then stay at the 15-hour maximum for the next 90 days (i.e., until the 135th day of the cycle). The day length will then be decreased linearly back to the minimum day length (i.e., 10 hours) during the next 45 days, thus completing the 180-day cycle.

As depicted in FIG. 9, the control computer will turn off the lights when the time of day corresponds to the time at which the lights are programmed to be turned off. If, however, the time of day corresponds to the time at which the lights are programmed to be turned on, the control computer will first determine whether the temperature in the growing chamber is below 100° F. If the growing chamber temperature is not below 100° F., the lights will not be turned on and the operator will be alerted by an audible signal and a message on display 78. If the growing chamber temperature is below 100° F., the computer will turn the lights on for the programmed duration. Furthermore, the control computer will continually monitor the growing chamber temperature and will automatically shut off the lights if the growing chamber temperature rises above 100° F. for more than five minutes. The lights will automatically be turned on after the growing chamber temperature has fallen to 95° F. or below for five minutes or more, provided, however, that the lights will not be automatically turned on more than two times during any twenty-four hour period, after having been turned off because of excessive temperature in the growing chamber.

Figures 10, 11:
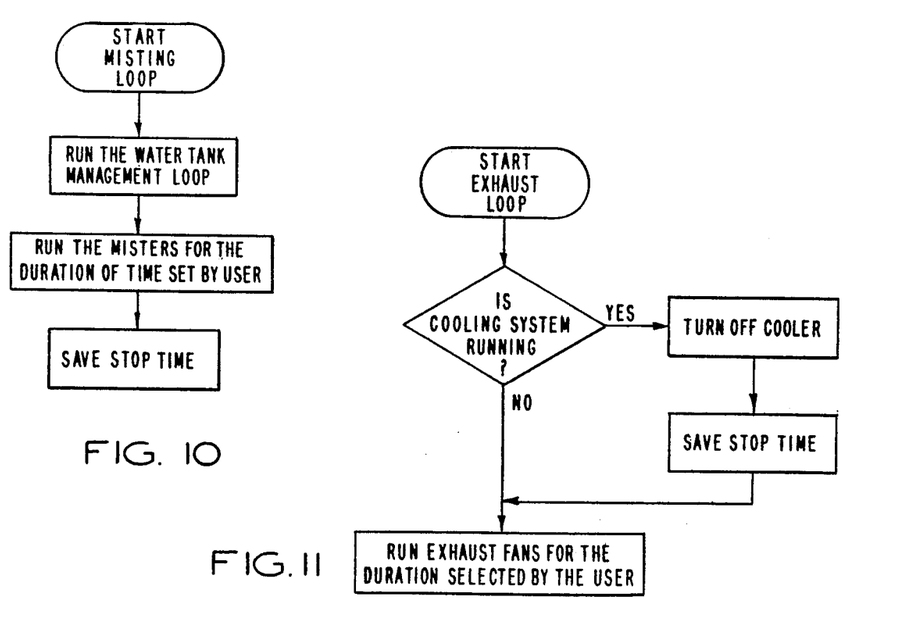

Referring to FIGS. 7 and 10, the user can program the operation of the misting cycle in either of two modes. The particular mode is selected using either forward key 88 or reverse key 90. In one mode, time key 96 and number keys 86 are used to enter the start time of the misting cycle and duration key 98 and number keys 86 are used to enter the time duration of that particular misting cycle. A maximum of 24 discrete misting cycles can be entered for each 24-hour period. Enter key 100 is pressed after the start time and duration of each misting cycle are entered. In the other mode, time key 96 and number keys 86 are used to enter master start and stop times of the misting cycle. Duration key 98 and number keys 86 are then used to divide the time interval between the master start and stop times of the misting cycle into a plurality of sub-cycles. The first push of duration key 98 indicates that the numerical data to follow represents the period of time that the misting equipment is to be operated during each sub-cycle, while the second push of duration key 98 indicates that the numerical data to follow represents the period of time that the misting equipment is not to be in operation between successive sub-cycles. The minimum time of operation of the misting equipment is one second, in addition to a start-up time lag of approximately four seconds. The maximum time during which the misting equipment can be programmed to operate is 30 minutes. The minimum time difference between the master start and stop times is 30 minutes and the maximum difference between the master start and stop times is 24 hours.

Figure 15:
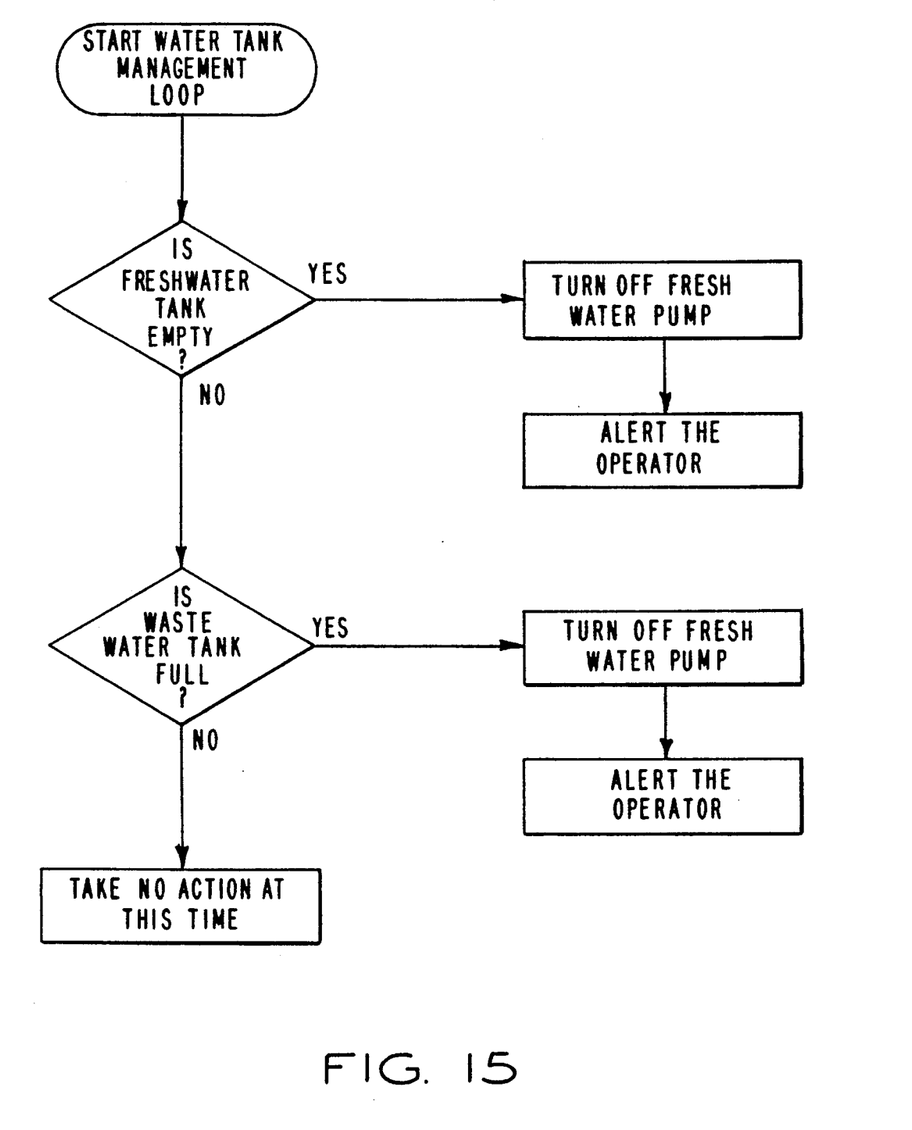

Referring to FIGS. 10 and 15, the status of the fresh water and waste water tanks is checked before operating the misting equipment. The water tank management loop is activated prior to the beginning of each misting cycle. If the fresh water supply tank is empty, the fresh water pump is de-activated and the operator is alerted by an audible signal and an error message on the display. An audible signal and error message are also generated when the fresh water tank level is near empty. If the fresh water tank is not empty, the waste water tank will be monitored to determine if it is full. If the waste water tank is full, the fresh water pump is turned off and the operator is alerted as before. The operator is also alerted when the waste water tank level is near full. If the fresh water tank is not empty and the waste water tank is not full, the misting cycle can begin, as depicted in FIG. 10. The waste water pump can be manually activated by the user via keypad 30, to evacuate the contents of the waste water tank as desired.

Referring to FIGS. 7 and 11, data relating to the ventilation (exhaust) cycle is entered using number keys 86 and time and duration keys 96 and 98 in substantially the same manner as that described above with respect to the misting cycle. The operation of the exhaust fans can be programmed to operate in either of two modes. In one mode, the start time and duration of up to 24 different ventilation cycles for each 24-hour period can be entered. In the other mode, the user enters master start and stop times and the "on" and "off" duration to cycle the exhaust fans on and off at selected intervals between the master start and stop times. The minimum duration of the exhaust fans is five seconds and the minimum time interval between the master on and off times is 30 minutes. The maximum time interval between the master on and off times is 24 hours. The total amount of time represented by the "on" duration and "off" duration cannot exceed one-half of the time interval between the master start and stop times. The air conditioning system 70 (FIG. 6A) is deactivated when the cabinet is ventilated, to maintain cool air within the cabinet.

Referring to FIGS. 6 and 7, air circulation fans 66 are operable according to a user-defined cycle. The user can program the control computer to operate air circulation fans 66 according to a user-selected air circulation cycle. Number keys 86 and time and duration keys 96 and 98 are used to enter data relating to the air circulation cycle in substantially the same manner as described above with respect to the ventilation cycle.

In accordance with another unique feature of the invention, the user is able to select whether a temperature differential is to be maintained in the growing chamber. In response to a user prompting command on display 80 (FIG. 7), the user activates "on" button 92 to select this option. If the temperature differential option is selected, air circulation fans 66 and evaporator blower 76 are in constant operation to maintain a horizontal temperature gradient within the growing chamber of approximately 10° F. with the coolest temperatures on the left side of the chamber and the warmest temperatures on the right side. Air conditioning system 70 is operated intermittently to maintain the desired temperature conditions in the chamber. If the user does not wish to select the temperature differential option, he pushes "off" button 94 in response to the user prompting command on display 80.

Figure 12:
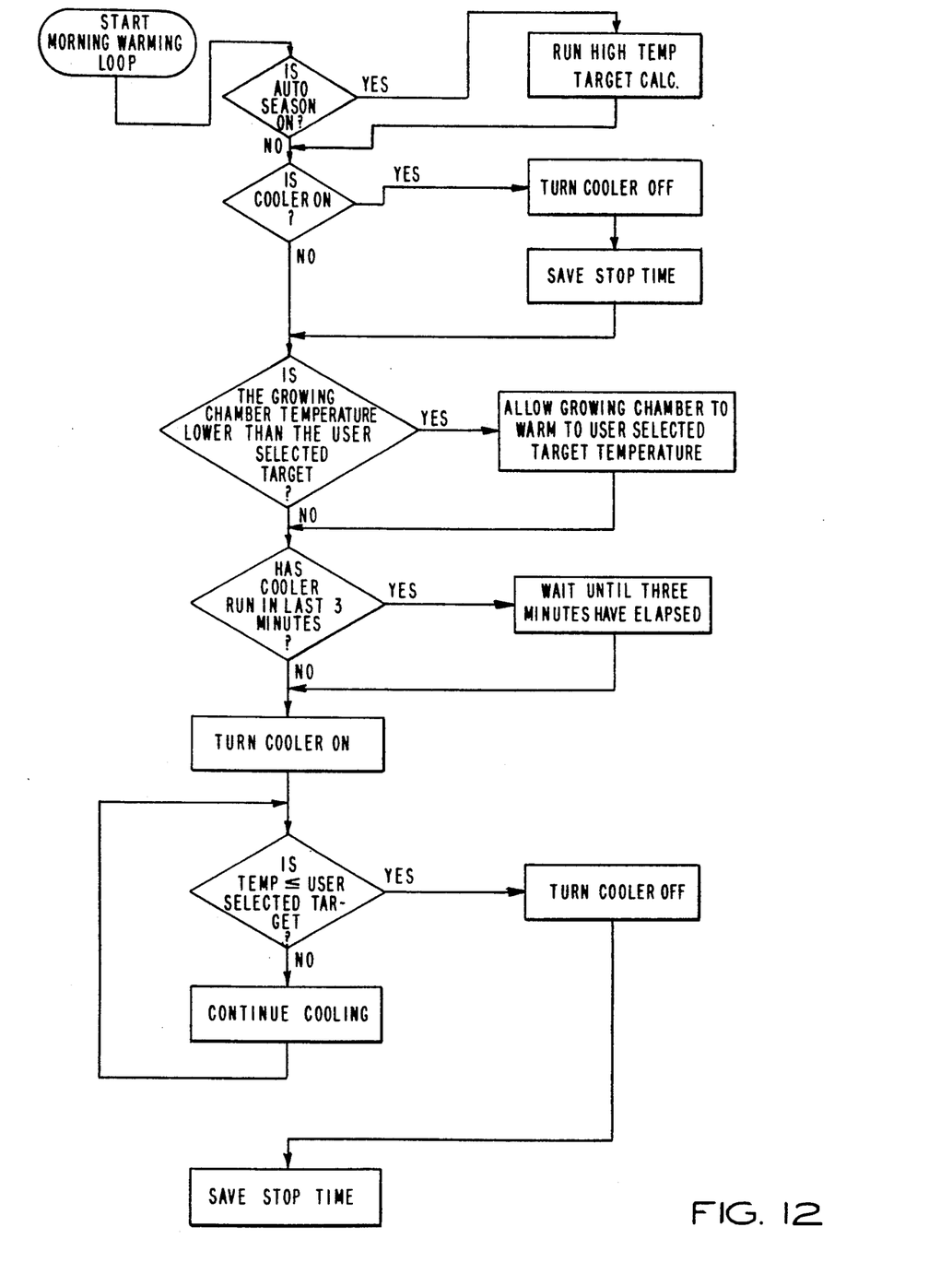

Referring to FIGS. 8 and 12, the growing chamber temperature is raised to the user-selected daytime temperature in accordance with a morning warming loop. If the air conditioning system (cooler) is on, it is turned off and the growing chamber temperature is monitored to determine if it is lower than the selected daytime temperature. If so, the growing chamber is allowed to warm to the selected daytime temperature. If the growing chamber temperature is not lower than the user-selected temperature, the control computer will determine whether the cooler has been operated during the last three minutes. If the cooler has been inoperative for at least three minutes, the cooler will be turned on until the growing chamber temperature is less than or equal to the user-selected temperature, at which time the cooler will be turned of f and the time at which the cooler is turned off will be saved. The cooler is cycled on and off as needed to maintain the growing chamber temperature within 2° F. of the user-selected temperature.

Referring also to FIG. 7, number keys 86 are used to enter the selected daytime temperature in response to a prompting command on display 80 and time key 96 is used to enter the start time of the morning warming loop. Number keys 86 are also used to enter a temperature ramp function, which corresponds to the desired change in temperature during each 30 minute time period after the start time of the morning warming loop. The minimum temperature change during each 30 minute period is 3° F. and the maximum temperature change during each 30 minute period is 10° F. At the onset of the morning warming loop, the cooler is turned off and the temperature is allowed to rise during the first 30 minutes by the prescribed ramp amount. The cooler is then turned on and off as needed to maintain the growing chamber temperature within approximately 2° F. of the intermediate temperature determined by the ramp function for 30 minutes. This procedure is repeated until the selected daytime temperature is reached. For example, assume that the growing chamber temperature is 60° F. at the beginning of the morning warming loop, the user-selected temperature is 80° F. and the ramp function is 10° F. The cooling system will be turned off until the growing chamber temperature rises from 60° F. to 70° F. The cooling system is then cycled on and off as needed to maintain the growing chamber temperature at 70° F. ±2° F. for 30 minutes. The growing chamber temperature is then allowed to warm another 10° F. to the user-selected temperature of 80° F. Once the user-selected temperature has been reached, the cooling system is operated as needed to maintain the growing chamber temperature within 2° F. of the user-selected temperature.

If the user fails to select a daytime temperature, a ramp function or a start time for the morning warming loop, the default setting of the daytime temperature is 75° F., with a ramp function of 3° F., and the morning warming loop will be set to begin i at 6:00 a.m. An audible signal is generated and an error message is displayed to alert the user if the growing chamber temperature remains 5° F. or more above the user-selected temperature for more than 15 minutes. If this condition occurs, the exhaust fans 44 (FIG. 4) are operated to reduce the growing chamber temperature within the prescribed limits.

Figure 13:
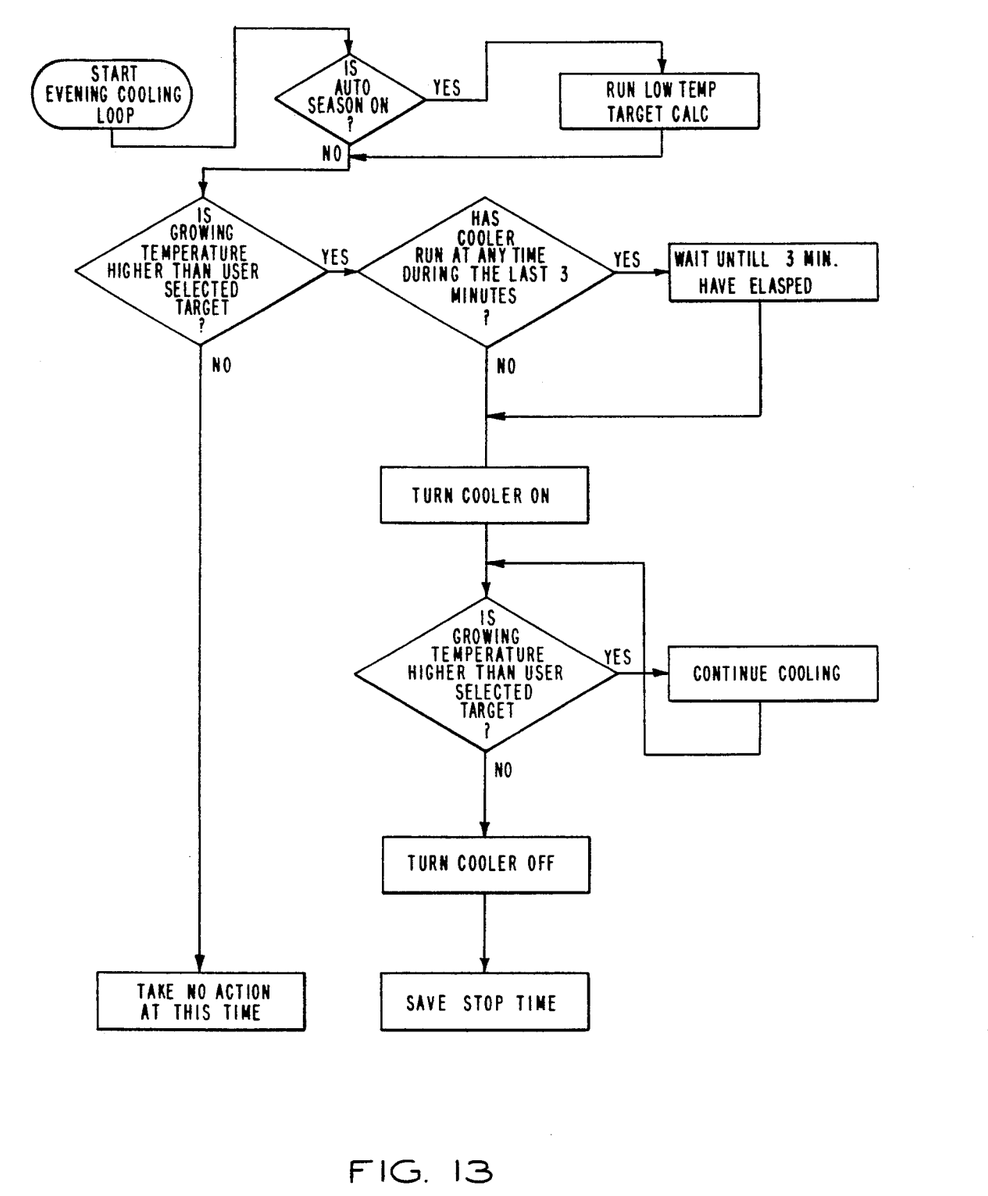

Referring to FIGS. 8 and 13, the growing chamber temperature is lowered to a user-selected nighttime temperature in accordance with an evening cooling loop. Referring also to FIG. 7, the user enters the selected nighttime temperature using number keys 86 and the start time for the evening cooling loop via time key 96. The ramp function, corresponding to the desired temperature change during each 30 minute period, is also entered using number keys 86. The maximum temperature change allowed for each 30 minute period is 10° F. and the minimum temperature change for each 30 minute period is 3° F. At the beginning of the evening cooling loop, the cooler is turned on and the temperature is allowed to fall by an amount corresponding to the user-selected ramp function. The cooler is then operated as needed to maintain the growing chamber temperature within 2° F. of the intermediate temperature determined by the ramp function for 30 minutes.

This procedure is repeated until the user-selected nighttime temperature is reached. The cooler is then operated as needed to maintain the growing chamber temperature within 2° F. of the user-selected nighttime temperature. The minimum time interval between each duty cycle of the cooler is three minutes. Therefore, the cooler will not be activated until it has remained inoperative for at least three minutes.

In an alternative mode of operation, the user can program the control computer to vary the daytime temperature and the nighttime temperature in accordance with a selected cycle, to simulate changes in daytime and nighttime temperatures during the various seasons of the year. In response to prompting commands on display 80, the user enters the number of days selected for the cycle, the maximum and minimum daytime temperatures, the maximum and minimum nighttime temperatures and the starting season (i.e., winter, spring, summer or fall) for the cycle. The user can also elect to maintain the selected daytime and nighttime temperatures at the mid-cycle levels for a selected number of days during the middle of the cycle.

For example, assume that the user selects the length of the cycle to be 180 days, the maximum daytime temperature to be 87° F., the minimum daytime temperature to be 79° F., the maximum nighttime temperature to be 68° F., and the minimum nighttime temperature to be 59° F., and that the starting season is winter. Since the winter season was selected as the starting season, the control computer will select the minimum daytime temperature (i.e., 79° F.) and the minimum nighttime temperature (i.e., 59° F.) as the initial target temperatures. If the user does not elect to stop and hold the daytime and nighttime temperatures at their respective mid-cycle levels for any length of time at the middle of the cycle, the control computer will cause the daytime and nighttime target temperatures to increase linearly from the initial minimum temperatures (i.e., 79° F. and 59° F., respectively) to the maximum daytime and maximum nighttime temperatures programmed by the user (i.e., 87° F. and 68° F.). The daytime and nighttime temperatures will reach their respective maximums at the midpoint of the cycle (i.e., the 90th day). The control computer will then decrease the daytime and nighttime target temperatures linearly from the respective maximum target temperatures back to the respective minimum target temperatures, during the second half of the cycle, so that at the end of the 180-day cycle, the daytime and nighttime target temperatures will again be 79° F. and 59° F., respectively.

If, however, the user elects to stop and hold the target temperatures at the mid-point of the cycle, he will enter the number of days (e.g., 60) that he desires to hold the target temperatures at their mid-cycle levels and the control computer will increase the daytime and nighttime temperatures at a faster rate, so that the daytime and nighttime temperatures reach their respective maximums (i.e., 87° F. and 68° F.) at the 60th day of the cycle. The daytime and nighttime temperatures will remain at their respective maximum levels for the "hold" period selected by the user (i.e., 60 days). When the "hold" period ends (i.e., the 120th day), the control computer will decrease the daytime and nighttime target temperatures linearly back to the respective minimum temperatures (i.e., 79° F. and 59° F.) during the last 60 days of the cycle.

In accordance with the present invention, the user can select the temperature conditions within the growing chamber to simulate the changing temperature conditions, as would occur in nature during the normal cycle of seasons.

Figure 14:
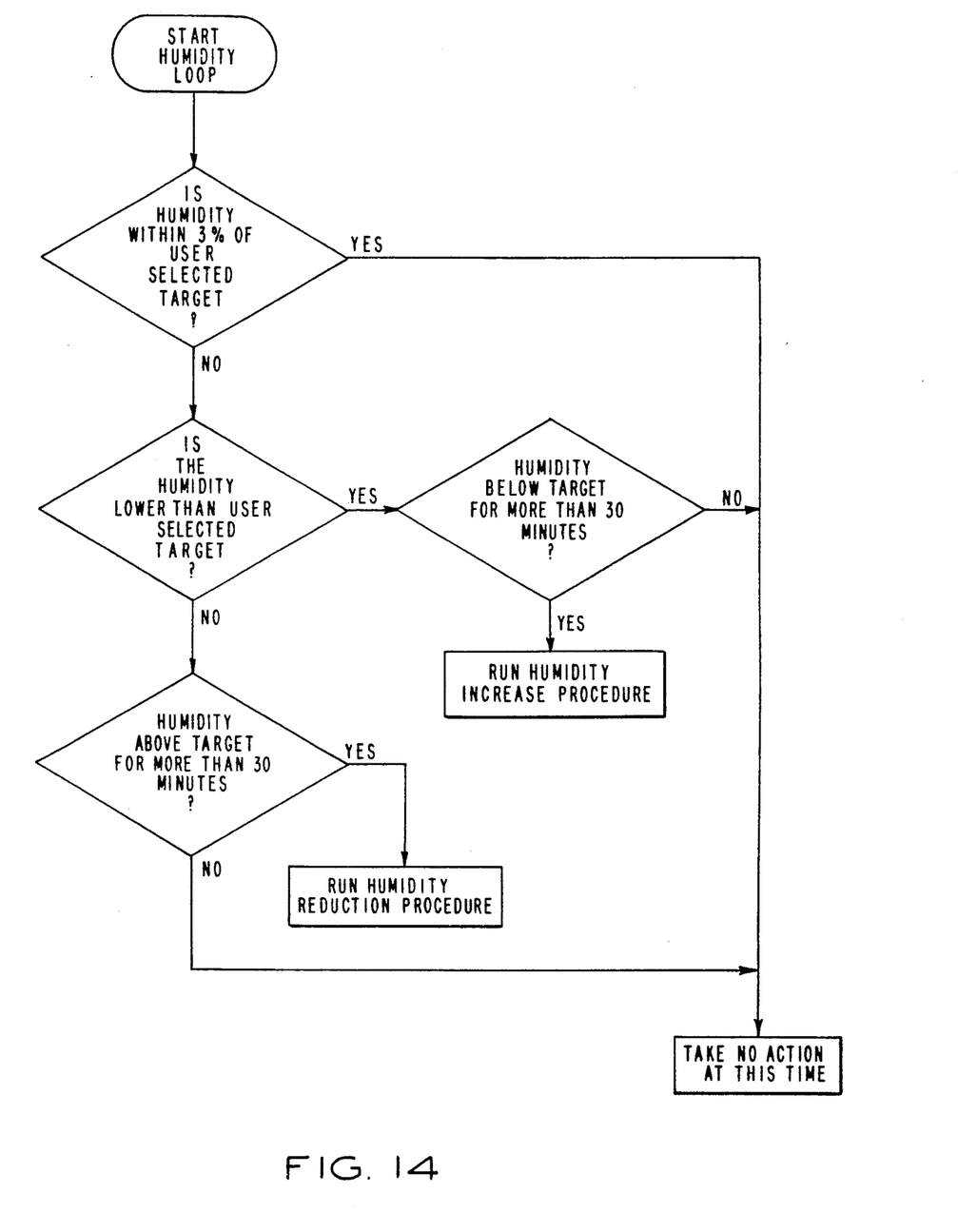

Referring to FIGS. 8 and 14, the control computer continually monitors the humidity within the growing chamber, to maintain the humidity within 3% of the user-selected humidity. Referring also to FIG. 7, the user enters selected daytime and nighttime humidity values via number keys 86. The user also enters the respective start times for implementing the selected daytime and nighttime humidity levels via time key 96. If the air circulation fans 66 (FIG. 6) are in operation and the humidity drops 3% or more below the selected humidity level for more than 30 minutes, the humidifiers 49 (FIGS. 5A, 5B) are turned on for one minute and the humidity will be monitored again after three additional minutes. This procedure (i.e., humidifiers on for one minute and off for three minutes) is iteratively performed until the ambient humidity within the growing chamber is equal to or greater than the user-selected humidity, at which time air circulation fans 66 are turned off.

If air circulation fans 66 are in operation and the ambient humidity remains more than 3% above the target for more than 30 minutes, the exhaust fans 44 (FIG. 4) are turned on for three minutes. After the exhaust fans 44 have been off for five minutes, the humidity is monitored again. If the humidity has fallen to a level which is equal to or less than 3% above the user-selected humidity, the exhaust fans 44 are deactivated. The foregoing procedure (i.e., exhaust fans on for three minutes and off for five minutes) is iteratively performed, up to a maximum of three times, if necessary. If, after three iterations of the foregoing procedure, the humidity has not fallen to a level which is equal to or less than 3% above the user-selected humidity, an audible tone will be sounded and an error message displayed.

If air circulation fans 66 are not in operation and the ambient humidity remains more than 3% above the target for more than 30 minutes, air circulation fans 66 are turned on for five minutes and the humidity is monitored again. If the ambient humidity has fallen to a level which is equal to or less than 3% above the user-selected humidity, air circulation fans 66 are deactivated. If the ambient humidity has not fallen below this level, air circulation fans are activated for an additional five minutes and the humidity is tested after each five minute fan cycle, up to a maximum of three fan cycles, if necessary. If, after air circulation fans 66 have been operated for three fan cycles of five minutes each, the humidity is still above the acceptable limit (i.e., greater than 3% above the user-selected humidity), the exhaust fans 44 are activated for three minutes, followed by air circulation fans 66 for an additional five minutes. The humidity is tested after each eight minute cycle of the exhaust fans 44 and air circulation fans 66. This procedure (exhaust fans 44 on for three minutes and air circulation fans 66 on for five minutes) is iteratively performed for a maximum of three cycles. If the humidity is still above the acceptable limit, an audible tone is sounded and an error message is displayed.

If the user fails to enter data relating to the selected humidity, the default daytime humidity will be set at 75% and the default nighttime humidity will be set at 65%. The default start time of the daytime humidity will be set at 6:00 a.m. and the default start time of the nighttime humidity will be set at 6:00 p.m.

Referring again to FIG. 7, the various functions are controlled manually by means of "on" and "off" keys 92 and 94, respectively. Forward and reverse keys 88 and 90 are used to select the particular function to be controlled and "on" and "off" keys 92 and 94 are used to respectively activate and deactivate the selected function. For example, if it is desired to turn on the misting equipment, either the forward key 88 or the reverse key 90 is used to select the misting function. The misting equipment is manually activated by pushing "on" key 92 and is manually deactivated by pushing "off" key 94. The other functions are manually controlled in substantially the same manner. In addition to being able to manually control the various functions via key pad 30, a plurality of manual override switches (not shown) are provided, to allow the user to control the various functions directly, rather than through the control computer. The manual override feature provides backup control in the event of computer malfunction.

The environmentally controlled cabinet according to the present invention is suitable for storing and displaying plants of various types. The environmental control system is self-contained within the cabinet, so that the entire system is portable and can be located as desired within a home or office. The ambient temperature within the growing chamber can be maintained at a relatively constant level, or alternatively, a predetermined temperature gradient can be maintained within the chamber to accommodate various types of plants which thrive under different temperature conditions.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims.

What is claimed is:

1. A portable cabinet for storing plants, comprising:
an enclosed chamber for storing the plants;
control means located in said cabinet and responsive to input commands for automatically controlling selected environmental conditions in said chamber according to a predetermined set of program instructions, said environmental conditions including the temperature of the chamber;
input means for entering input commands into said control means, said input commands indicating desired environmental conditions to be maintained in said chamber;
air moving means adjacent one side of said chamber for directing a substantially lateral flow of air toward an opposite side of said chamber;
air cooling means located outside said chamber;
first air duct means communicating between said opposite side of said chamber and said air cooling means for directing at least a portion of the air directed toward said opposite side of said chamber by said air moving means to said air cooling means; and
second air duct means communicating between said opposite side of said chamber and said air cooling means for directing cooled air form said air cooling means into said chamber adjacent said opposite side of said chamber, the cooled air having a lower temperature than the temperature of the air directed toward said opposite side of said chamber by said air moving means, whereby a temperature differential is maintainable between said one side of said chamber and said opposite side of said chamber.

2. The cabinet of claim 1, wherein said air cooling means includes blower means for maintaining air circulation through said air cooling means, said blower means being operable for drawing air through said first air duct means into said air cooling means and for blowing cooled air through said second air duct means.

3. The cabinet of claim 2 wherein said first and second air duct means terminate at respective first ends thereof at an air manifold adjacent said opposite side of said chamber and at respective second ends thereof, opposite from the respective first ends thereof, at respective suction and discharge sides of said air cooling means, said first air duct means terminating at a central portion of said air manifold, said second air duct means being divided into two branches adjacent said manifold, said branches terminating at respective opposite sides of said manifold, such that said substantially lateral flow of air opposes the flow of cooled air from said opposite sides of said manifold toward said one side of said chamber.

4. A portable cabinet for storing plants, comprising:
an enclosed chamber for storing the plants;
control mans located in said cabinet and responsive to input commands for automatically controlling selected environmental conditions in said chamber according to a predetermined set of program instructions;
input means for entering input commands into said control means, said input commands indicating desired environmental conditions to be maintained in said chamber;
irrigating means for irrigating the plants in said chamber; and
collecting means located below said chamber for collecting material flowing downwardly from said chamber, said irrigating means including a storage tank for storing irrigation liquid and liquid transport means for transporting irrigation liquid from said storage tank to said chamber, said collecting means including a collection tank and means for evacuating the contents of said collection tank, said control means including means for monitoring the volume of irrigation liquid in said storage tank and the volume of material in said collection tank, said monitoring means being responsive to a first condition indicating that the volume of irrigation liquid in said storage tank is below a predetermined minimum volume or a second condition indicating that the volume of material in said collection tank is above a predetermined maximum volume for automatically disabling said liquid transport means.

5. A portable cabinet for storing plants, comprising:
an enclosed chamber for storing the plants;
control means located in said cabinet and responsive to input commands for automatically controlling selected environmental conditions in said chamber according to a predetermined set of program instructions, said environmental conditions including the humidity of said chamber;
input means for entering input commands into said control means, said input commands indicating desired environmental conditions to be maintained in said chamber;
humidifying means for humidifying said chamber;

humidity sensing means for sensing the humidity of said chamber;

air circulation means for circulating air in said chamber;

ventilating means communicating between said chamber and an environment exterior to said cabinet for ventilating said chamber;

said control means being responsive to said humidity sensing means for controlling said humidifying means to maintain the humidity of said chamber within a predetermined range, said control means being operable to activate said air circulation means for a first predetermined time interval in response to the humidity of said chamber being below a predetermined minimum limit, if the air circulation means is not already in operation, and to activate said humidifying means for a second predetermined time interval if the humidity of said chamber remains below said predetermined minimum limit after said air circulation means has been operated for a period of time at least equal to said first predetermined time interval, said humidifying means being selectively activated and deactivated according to a predetermined iterative cycle until either the humidity of said chamber is within said predetermined range or the number of iterative cycles equals a prescribed maximum number, said control means being further operable to activate said air circulation means for a third predetermined time interval in response to the humidity of said chamber being equal to or greater than a predetermined maximum limit, if said air circulation means is not already in operation, and to activate said ventilating means for a fourth predetermined time interval, if the humidity of said chamber remains above said predetermined maximum limit after said air circulation means has been operated for a period of time at least equal to said third predetermined time interval, said ventilating means being selectively activated and deactivated according to a predetermined iterative cycle until either the humidity of said chamber is within said predetermined range or the number of iterative cycles equals a prescribed maximum number.

6. The cabinet of claim 5 wherein said humidifying means includes means located beneath said chamber for emitting a relatively fine spray of water and said air circulation means includes air moving means located in a top part of said chamber for drawing at least a portion of the water spray emitted by said humidifying means upwardly through said chamber.

7. A portable cabinet for storing plants, comprising:

an enclosed chamber for storing the plants;

control means located in said cabinet and responsive to input commands for automatically controlling selected environmental conditions in said chamber according to a predetermined set of program instructions, said environmental conditions including the temperature of the chamber;

input means for entering input commands into said control means, said input commands indicating desired environmental conditions to be maintained in said chamber;

cooling means for cooling said chamber;

temperature sensing means for sensing the temperature of said chamber, said control means being responsive to said temperature sensing means for selectively enabling and disabling said cooling means to maintain the temperature of said chamber within a predetermined range according to said input commands, said control means being operable to control said cooling means to increase the temperature of said chamber at a predetermined rate in response to the temperature of said chamber being below a predetermined minimum limit until the temperature of said chamber is within said predetermined range and to decrease the temperature of said chamber at a predetermined rate in response to the temperature of said chamber being above a predetermined maximum limit until the temperature of said chamber is within said predetermined range; and illuminating means for illuminating said chamber, said control means being responsive to said input commands for selectively enabling and disabling said illuminating means at predetermined times and being further responsive to the temperature of said chamber for automatically disabling said illuminating means when the temperature of said chamber exceeds a first predetermined temperature for a first predetermined time interval and for automatically enabling said illuminating means when the temperature of said chamber is less than or equal to a second predetermined temperature, which is less than said first predetermined temperature, for a second predetermined time interval.

* * * * *